J. A. MORTERUD.
CREAM SEPARATOR.
APPLICATION FILED MAR. 15, 1916.
1,280,523.
Patented Oct. 1, 1918.
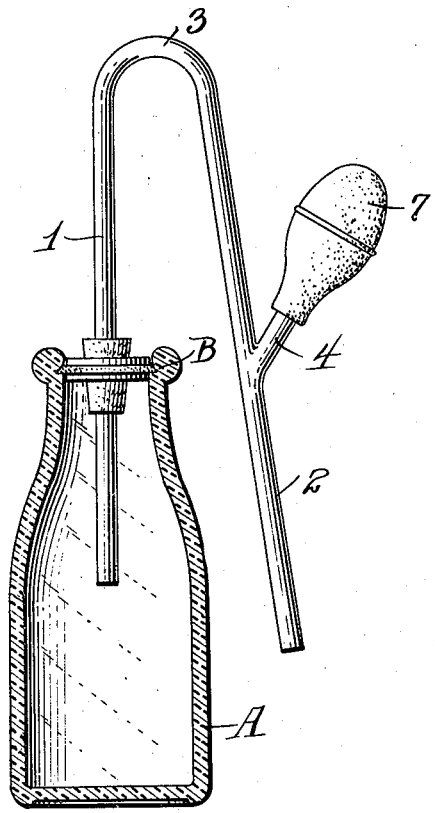
Fig. 1.
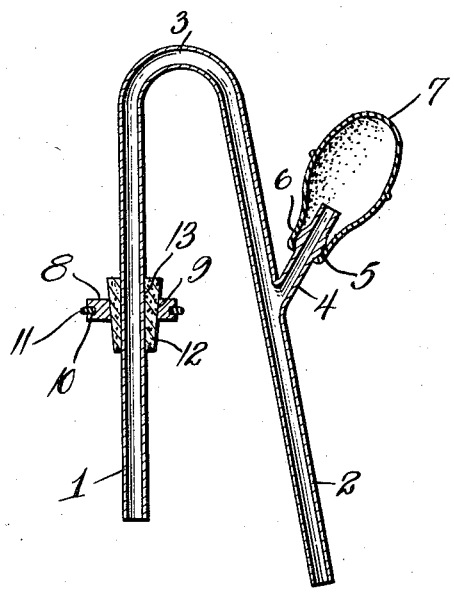
Fig. 2.
Fig. 3.
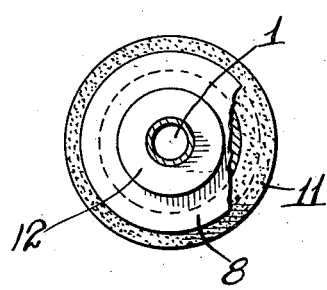
WITNESSES
M. A. O'Connor
Wm. H. Mulligan
INVENTOR,
John A. Morterud,
BY Richard B. Owen,
ATTORNEY.

UNITED STATES PATENT OFFICE.

JOHN A. MORTERUD, OF DULUTH, MINNESOTA.

CREAM-SEPARATOR.

1,280,523.

Specification of Letters Patent.

Patented Oct. 1, 1918.

Application filed March 15, 1916. Serial No. 84,425.

*To all whom it may concern:*

Be it known that I, JOHN A. MORTERUD, a citizen of the United States, residing at Duluth, in the county of St. Louis and State of Minnesota, have invented certain new and useful Improvements in Cream-Separators, of which the following is a specification.

This invention relates to cream separators and more particularly to a cream separator which is employed in connection with a milk bottle whereby the cream may be removed from the top of the milk in a manner that will prevent agitation of the milk and cream and be clean and sanitary in its operation.

A further object of the invention is the provision of a cream separator that will operate on the siphon principle and which will be mounted on the bottle of milk in a manner that will allow it to be longitudinally adjusted for different depths of cream.

A further object of this invention is the provision of a cream separator which consists of comparatively few parts and is simple in construction, but durable and well adapted to withstand the usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a vertical section through a milk bottle showing the cream separator in side elevation.

Fig. 2 is a vertical section through the cream separator, and

Fig. 3 is a top plan of the supporting structure partly broken away.

The siphon consists of the intake pipe 1 and the discharge pipe which is slightly longer than the intake pipe 1 and both the intake pipe and the discharge pipe are formed from a single piece of pipe bent as at 3 at a point intermediate the ends of the pipe. Integrally formed with the discharge pipe 2 is a branch pipe 4 which communicates with the interior of the discharge pipe 2 and is provided adjacent its free end with an enlarged portion 5 which is designed to receive the end 6 of a bulb 7, the purpose of which will be presently described.

For supporting the siphon in the neck of the bottle A, I provide a supporting disk 8 which has a central tapered aperture 9 and is provided with an annular groove 10 around its edge for receiving a rubber gasket 11, the outer edge of which is adapted to be mounted in air-tight engagement with the interior annular groove B formed in the upper portion of the neck of the bottle A. Mounted in the tapered aperture 9 of the supporting disk 8 is a tapered cork 12 provided with a longitudinal central opening 13 through which the intake pipe 1 is extended, the opening being of a size that will cause the cork to tightly and frictionally engage the intake pipe 1 to prevent the passage of air through the aperture or opening 13 but will allow, at the same time, the intake pipe 1 to be adjusted vertically in the bottle for different depths of cream.

In the operation, the device will be mounted in a milk bottle by placing the gasket 11 in the annular groove B formed in the upper portion of the neck of the bottle and the intake pipe 1 adjusted until the end of the pipe is deep enough in the bottle to reach all of the cream on the top of the milk. The operator will then squeeze the bulb 7 thereby forcing the air out of the same and, after placing his finger over the end of the opening in the end of the discharge pipe, the bulb 7 will be released whereupon the suction thereby created will draw the cream through the intake pipe. After the finger of the operator is removed from the end of the discharge pipe 2 the cream will continue its passage through the intake and discharge pipes until all of the cream has been removed from the top of the milk.

From the foregoing it will be observed that a very simple and durable cream separator has been provided, the details of which embody the preferred form. I desire it to be understood however, that slight changes or modifications in the minor details of construction may be made without departing from the spirit of the invention or the scope of the claims hereunto appended.

I claim:

1. A device of the character described adapted for use with a bottle having its neck provided with an interior annular groove comprising a supporting disk provided with an annular groove at its marginal edge, a rubber gasket fitted in the said groove in the supporting disk and projecting beyond the marginal edge thereof to be received in the said annular groove in the bottle neck, the said supporting disk having a central tapered aperture, a tapered cork mounted in the said aperture in the supporting disk, and a tube bent approximately intermediate its ends to form an intake pipe and a discharge pipe, the said intake pipe being extended through the center of the said tapered cork and into the bottle.

2. A device of the character described, adapted for use with a bottle having its neck provided with an interior annular groove, comprising a supporting disk adapted for reception in the neck of the bottle and provided with means to be received in the said annular groove for retaining the said supporting disk in position in the neck of the bottle, the said supporting disk having a central aperture, a tapered cork mounted in the said aperture in the said disk, and a tube provided with an intake portion and a discharge portion, the said intake portion being extended through the center of the said tapered cork.

In testimony whereof I affix my signature in presence of two witnesses.

JOHN A. MORTERUD.

Witnesses:
S. MORTERUD,
E. HATLEY.